C. CARSON.
HUB ODOMETER.
APPLICATION FILED JUNE 17, 1920.
1,424,000.
Patented July 25, 1922.
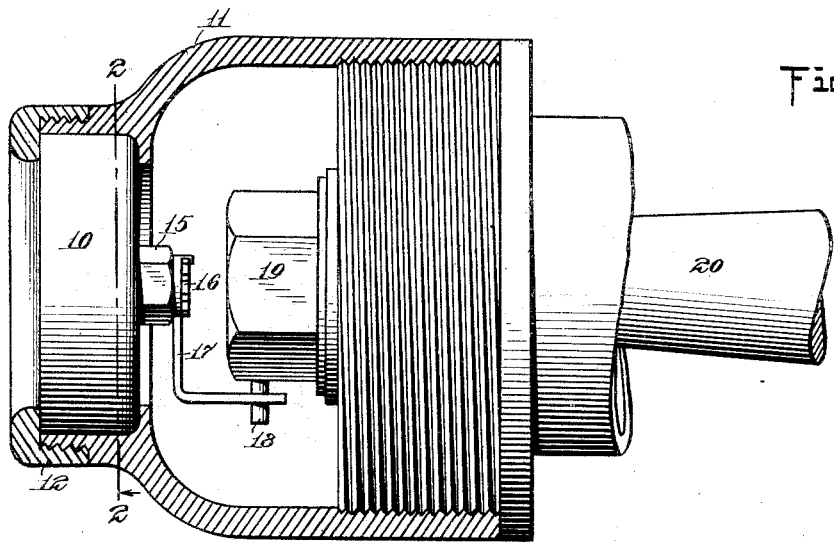
Fig.1.
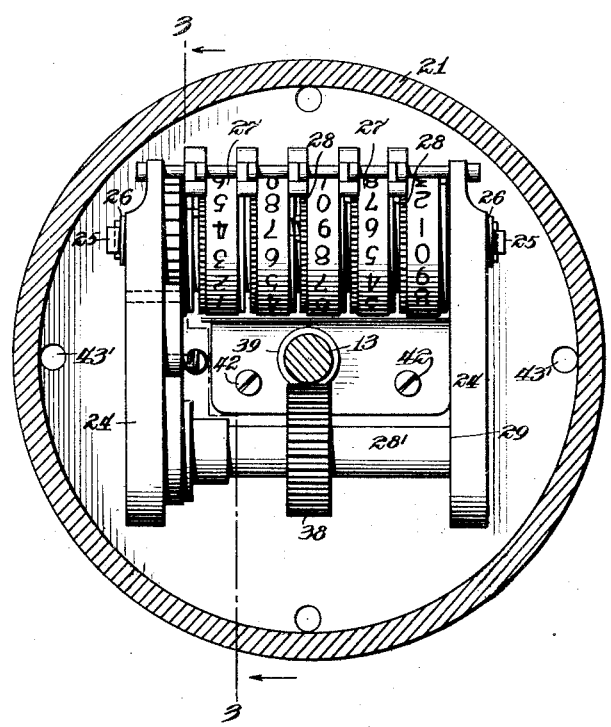
Fig.2.
Fig.3.
INVENTOR
Clarence Carson
BY
Warren S. Orton.
ATTORNEYS

UNITED STATES PATENT OFFICE.

CLARENCE CARSON, OF NEW ROCHELLE, NEW YORK, ASSIGNOR TO JOHNS-MANVILLE INCORPORATED, A CORPORATION OF NEW YORK.

HUB ODOMETER.

1,424,000.  Specification of Letters Patent.  Patented July 25, 1922.

Application filed June 17, 1920. Serial No. 389,551.

*To all whom it may concern:*

Be it known that I, CLARENCE CARSON, a citizen of the United States, and resident of New Rochelle, in the county of Westchester and State of New York, have invented certain new and useful Improvements in Hub Odometers, of which the following is a specification.

The invention relates in general to certain improvements in hub odometers and specifically relates to certain improvements in such an instrument of the type designed to be mounted in the hub cap of a vehicle wheel for bodily rotary movement and in which the contained odometer mechanism is actuated from the reaction therewith of a relatively fixed shaft projecting from the instrument along the axis of rotation and held from rotary movement by the engagement thereof with a fixed member such as the axle of the vehicle.

It is understood that instruments of this character are intended primarily to be mounted on trucks and other heavy vehicle where they are generally subjected to hard usage, due not only to the jarring incidental to the running of such vehicle, but also due to blows and knocks from other sources and to the deleterious action of ice, water, dirt and the like which accumulates on the hubs of the vehicles.

The primary object of the invention is to provide a simple form of hub odometer of the class outlined which will be accurate and positive in its operation under the severe usage to which such devices are put and at the same time to provide an instrument which can be manufactured cheaply in large quantities with the least possible use of material and with the minimum amount of refined machining or other expensive labor factors of cost.

Incidental to this general desideratum another object of the invention is to provide a structure of the type described in which a relatively small amount of metal is distributed not only to provide the necessary mechanical parts but also to coact so as to provide a rigidly braced and rugged structure without using any large amount of material specifically for this purpose.

Another object of the invention is to provide a form of instrument which can be stored as a stock part and readily modified on the receipt of an order for any particular diameter wheel so as to give accurate linear readings when applied to the wheels of different diameters, simply by substituting certain replaceable elements to give the desired gear reductions and as a further refinement to provide a construction in which this changing of driving ratio reductions can be effected without changing the odometer mechanism proper.

Still another object of the invention is to provide a construction in which the driven parts of the odometer mechanism are maintained in positive driving position during the rotary movement of the device as a whole and in general the device features simplicity in mechanical construction.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a view largely in outline of one end of a vehicle axle with a hub cap shown in vertical section and equipped with a preferred embodiment of the invention;

Figure 2 is an enlarged view in rear elevation of the odometer mechanism and taken in vertical section on line 2—2 of Figure 1; and Figure 3 is a vertical sectional view taken on the broken line 3—3 of Figure 2 looking in the direction indicated by the arrows.

From the showing in Figure 1, it is noted that the odometer 10 is disclosed in operative position mounted in a revolving hub cap 11 and demountably secured in position by a flanged retaining ring 12. The main shaft 13 of the instrument extends rearwardly through the rear wall 14 of the casing and through a shaft journaling nut 15, screwed into the wall 14 and acting to prevent the entrance of dirt, dust, grease or water into the interior of the casing about the shaft. The rear externally projecting end 16 of the shaft is provided with a suitable L-shaped crank-like finger 17 designed to engage against the side of a pin 18 projecting laterally from a nut 19 at the end of the fixed axle 20 as is usual in the mounting of such instruments.

There is shown particularly in Figures 2 and 3, a mechanism containing casing 21 which is preferably a thin sheet metal stamping which may be formed of relatively thin gauge metal as this part of the instrument is not intended to withstand any severe distorting strains nor is it intended to support the contained mechanism. The casing illustrated is of a flat cylindrical form as this form is most conveniently shaped to fit the hub caps now in general use, but the shape of the casing will obviously be that form which lends itself most conveniently to the configuration of the mounting part. The end containing casing is opened at its front end as shown in Figure 3 and is otherwise closed so as to minimize the possibility of dirt, dust, grease and water filtering into the interior of the casing. The side wall outlining the open end of the casing is internally recessed to provide an annular shoulder 22 on which shoulder is fitted a circular mounting or base plate 23. This plate differs from the casing 21 in that it is intended to withstand distorting strains and due to its interfitting within the casing, acts as an internal reinforcement to prevent diametrical collapsing of the casing. The mounting plate constitutes the sole support for the odometer mechanism and is so designed that the removal of the plate carries with it all of the mechanism.

The plate 23 is provided on its rear face with a pair of spaced apart side bearing plates 24 fixed edgewise to the mounting plate and, as shown in Figure 3, substantially filling the space between the mounting plate and the rear wall 14 of the casing. These side plates are characterized by having relatively great thickness and, as they are quite massive, act materially in resisting any tendency of the plate 23 from being forced towards the wall 14. In other words the side plates act not only to prevent buckling of the base plate thus adding to its strength but also act to prevent crushing action of the casing as a whole in an axial direction. These relatively thick side plates are drilled in the direction of their thickness to provide long bearings for the shafts hereinafter described and coact with these shafts to provide a rugged, well-braced frame for carrying the odometer parts. One of the shafts 25 extends between and through each of the side plates and is provided with pinned abutment washers 26 at its outer ends which thus act to defeat any tendency of the plates to spread apart. A numeral wheel set made up of a series of connected number wheels 27 is loosely mounted upon the shaft 25 and includes in its organization a one-way counter drive ratchet 28 at one end abutting against the inner face of one of the plates 24. The numeral wheel set fits snugly between the side plates 24 and thus tend to prevent any collapsing movement of the plates relative to each other, while permitting free rotary movement of the ratchet and connected numeral wheel.

Another of the shafts 28', hereinafter identified as the secondary drive shaft, has its opposite ends journalled in another set of the long bearings in the side plates 24. The central portion of the shaft 28' is enlarged from the bearing ends to form a large diametered central portion with abutting shoulders 29 at opposite ends designed to engage the inner face of each of the side plates and thus supplement the action of the numeral wheel set in maintaining the side plates in their present spaced-apart position. It is understood that the two shafts 25 and 28', together with the numeral wheel set and the enlarged central shouldered portion of the shaft 28', coact to form a strong well-braced unit free of rattle and other deleterious wearing actions. The enlarged portion of the shaft 28' below the ratchet 27 is further enlarged to form a flat eccentric cam 30 which cam is rotatably mounted in the lower wide end of an upstanding triangular shaped feeding pawl 31. The upper apex of the feeding pawl is bent to one side of the line of thrust of the pawl and constitutes a lifting finger 32 designed to engage succeeding teeth 33 of the ratchet 27 and feed the ratchet in an anti-clockwise direction (see Figure 3) with a step-by-step motion. It is understood that this feed ratchet actuates the numeral wheels in succession as is usual in odometer constructions of the type illustrated, and one form of which is disclosed in my Patent No. 1,319,-203, granted October 21st, 1919.

A locking pawl 33' is fulcrumed to a pin 34 projecting from the adjacent side plate 24 and is positioned below the axis of rotation of the ratchet 27. The pawl 33 is provided with a finger 35 for engaging the teeth of the ratchet to prevent reverse movement thereof during the dwell of the feeding pawl. A short coiled tension spring 36 has one end secured to a depending arm 37 of the locking pawl and has its opposite ends secured to the feeding pawl intermediate its fulcrum and ratchet engaging finger. By this spring construction the engaging ends of the pawls are maintained in resilient engagement with the periphery of the counter-drive ratchet and the parts are so proportioned that tension on the spring is released or rather partially released, when the feeding pawl is in operative engagement with the ratchet to lift the same and is under relatively high tension during the period while the locking pawl is holding the ratchet and the feeding pawl is receding to its new ratchet engaging position.

The secondary shaft 28' is provided with a gear wheel 38 of relatively large diameter, so as to attain the necessary gear reduction, and is centered on the shaft 28' so as to bring the same in line with a diameter passing through the axis of the casing. For the purpose of facilitating the identification of parts in this description and in the following claims, it will be considered that the mechanical parts as thus far described constitute the odometer mechanism and that the main drive shaft 13 is a readily replaceable and supplemental part. The shaft 13 is provided with a worm 39 designed to engage with the gear 38. It is appreciated that the tooth relation between this worm and gear establishes the reduction ratio between the relatively fixed shaft 13 and the permanently mounted secondary shaft 28'.

The inner end of the shaft 13 is journalled in the mounting plate 23 and the portion adjacent the outer end is journalled in the nut 15 which may of course contain an anti-friction bearing and may also contain packing and glands for keeping grease out of the odometer casing. In this way the shaft 13 is journaled at two spaced apart joints.

The shaft 13 is of relatively rigid construction and acts to transmit shocks on the exposed face plate, through the mounting plate to the rear wall 14 of the casing. This is the most likely direction in which strains are imposed on the instrument while in use and the present disclosure features means for distributing any such strains.

It is intended that different shafts 13 or rather shafts with different pitches to the worm carried thereby may be supplied with each instrument or preferably different worm shafts are to be carried in stock by the dealer so that in order to equip the odometer mechanism for use on any one of the standard diametered wheels, the proper worm drive can be selected and inserted into position through the rear wall 14 of the casing and into position engaging the gear 38 which forms part of the permanent stock structure. In other words the dealer will carry a stock of casings with all parts of the odometer mechanism mounted therein except of shaft 13 and its gear 38 and will carry a supply of standardized shafts 13 and gears 38 for the different diameter of wheels in general use.

It is understood that in devices of this character, the odometer casing with its contained mechanism is usually exposed to lubricating substance in the hub cap. Due to whatever centrifugal effect may be produced in the device disclosed, this lubricating substance will tend to approach the outer side of the interior of the casing, and in this way any tendency of the lubricant to creep along the shaft 13 to the exterior of the casing is minimized. However, it is desired further to insure the maintaining of the lubricant away from the opening of the axis of the casing, and for this purpose a partition 40 is disposed to extend between the numeral wheel set and the shaft 13. This partition extends parallel to the axis of rotation of the numeral wheel set and is positioned relatively close to the periphery of the wheel set. This partition is shown to be one flange of an angle bracket, formed of very thin sheet metal and fastened by means of screws 41 passing through its other flange 42 abutting the inner side of the mounting plate 23.

The mounting plate is provided with the usual form of sight opening 43 positioned opposite the numeral wheel set so that the numerals on the wheel set can be visible from the outside of the casing. The sight opening 43 is covered by a transparent strip of celluloid 44 coextensive with the area of the mounting plate and which in turn is held in position by means of a face plate 45 secured in place by screws passing through the screw holes 43 in the mounting plate. The face plate is provided with sight openings 47 facing the opening 43 and is designed to constitute a name plate. In operation and with the proper main driven shaft positioned, it will be understood that the rotating casing will carry the mechanism about the fixed main drive shaft and thus cause the revolving and rotating secondary drive shaft to actuate the numeral wheel set through the one-way pawl and ratchet feed connection.

By this construction it is seen that there is provided a grease and dirt tight hub odometer which can be made relatively small, compact and with a high degree of rigidity compared to the amount of material used thus featuring economy in manufacturing cost.

Any desired gear ratio in the driving mechanism can be readily attained simply by utilizing the proper size of main driving shaft and worm wheel and these can be changed by unskilled labor and without affecting the mechanism or even the readings of the numeral wheel set or its ratchet controlling drive. The proper size case is simply stuck in the cap and the ring 12 screwed in place without regard to the locating of the crank arm 17 for it will automatically engage the pin 18 on the first revolution of the wheel.

The different parts of the mechanism have been balanced so far as is physically possible, so as to bring the center of gyration in a circle with the axis of rotation as a center and thus minimize any tendency of the centrifugal force developed during the revolving of the instrument from straining the parts.

The partition acts to retard the flow of the lubricant towards the externally projecting shaft during the period of time when the numeral wheel set is above the axis of rotation of the instrument. This structure will act to maintain the lubricant on the numeral wheel set and will coact with the centrifugal force developed to maintain the lubricant away from the center of the revolving casing and thus prevent leakage along the shaft 13. However, it is understood that rotary movement of the casing is not at high speed and there will at all times be sufficient lubricant on the gear 38 and worm 39 to insure an easy meshing of those parts.

While I have shown and described and have pointed out in the annexed claims, certain novel features of my invention, it will be understood that various omissions, substitutions and changes in the several steps of my process and in its operation and in the form and details of the apparatus illustrated may be made by those skilled in the art without departing from the spirit of the invention.

Having thus described my invention, I claim:

1. In a hub odometer, the combination of a closed cylindrical casing mounted for rotary movement about its axis, an odometer mechanism including a numeral wheel set contained within said casing, a relatively fixed shaft extending axially into said casing, a driving connection between the numeral wheel set and said shaft and a lubricant-travel-limiting partition disposed between the numeral wheel set and the shaft at the axis.

2. In a hub odometer, the combination of a closed cylindrical casing mounted for rotary movement about its axis, an odometer mechanism including a numeral wheel set contained within said casing, a relatively fixed shaft extending axially into said casing, a driving connection between the numeral wheel set and said shaft and a lubricant-travel-limiting partition disposed between the numeral wheel set and the shaft at the axis, said partition disposed in a plane parallel to the axis of rotation of the wheel set perpendicular to the axis of the shaft and in close proximity to the periphery of the wheel set.

3. A hub odometer designed to be mounted for rotary movement and including a relatively fixed shaft at the axis of rotation, odometer mechanism spaced from the shaft and operatively connected to be actuated thereby and means including a partition disposed between the odometer mechanism and the fixed shaft and controlled by the centrifugal force developed by the rotation of the odometer for maintaining lubricant away from the axially disposed shaft and substantially confined to the odometer mechanism.

4. A hub odometer designed to be mounted for rotary movement and including a relatively fixed shaft at the axis of rotation, odometer mechanism spaced from the shaft and operatively connected to be actuated thereby and a partition disposed between part of the odometer mechanism and the axially disposed shaft.

5. A hub odometer including a cylindrical casing having an open end and a closed end adapted to be mounted for rotary movement about the axis of the casing, an insert for the casing acting to brace the same against distortion and including a mounting plate constituting a closure for the casing and two side bearing plates extending from the mounting plate to the closed end, a relatively fixed worm shaft positioned at the axis of rotation and having spaced apart bearings in the mounting plate and in the closed end, a pair of parallel members positioned on opposite sides of the worm gear and having broad bearings at opposite ends engaging the side plates and coacting to maintain the same in spaced apart position, one of said members constituting a secondary drive shaft geared to the worm shaft and the other member constituting a combined numeral wheel set and driving ratchet wheel therefor and a one-way feeding pawl carried by one of the walls and connecting the secondary shaft and the driving ratchet.

6. In a hub odometer, the combination with a hub having a cylindrical recess, of a cylindrical mechanism containing casing fitted in said recess, a circular base plate for closing the outer end thereof, an odometer mechanism supported from said plate, removable as a unit from said casing and hub and including a numeral wheel set and a secondary shaft mounted on opposite sides of the axis of said casing, a gear carried by the secondary shaft adjacent said axis, and a driving connection between the secondary shaft and the numeral wheel set, a main driving shaft constituting a unit distinct from the odometer mechanism, disposed coincident with said axis, journalled adjacent opposite ends in the base plate and casing and provided intermediate its journalled points with a worm drive adapted to mesh with the gear on the secondary shaft and coact therewith to control the ratio of speeds between the main and secondary shafts, said main shaft and secondary drive shaft gear adapted to be replaced by others having different worm and gear thereby to change the speed ratio of the shafts without affecting the odometer mechanism.

7. In a hub odometer adapted to revolve about a centrally disposed axis, the combination with a supporting plate having a flat face facing the axis of rotation and having two parallel shafts extending in one direction therefrom, a numeral wheel set and a one-way ratchet wheel for driving the same, said wheel being loose on one of said shafts and engaging said flat face maintained by the numeral wheel set in engagement with said face and the other shaft constituting a driving shaft and having a cam also engaging said face, a relatively long pushing pawl disposed between the axis and supporting plate and in sliding engagement along its entire length with said face and having a lifting finger adapted to engage the radial faces of the ratchet wheel teeth to push the ratchet wheel with a step-by-step motion as the driving shaft is rotated.

8. A hub odometer including a mechanism, containing casing and including a mounting plate, said casing and its contents adapted to be mounted in the hub of a wheel to rotate therewith, a fixed driving shaft extending into the casing at right angles to the plate, a pair of supporting plates extending edgewise from said mounting plate and positioned on opposite sides of the fixed driving shaft, a pair of bracing shafts journalled at opposite ends in said plates, positioned on opposite sides of the driving shaft and coacting with the plates to form a bracing frame symmetrically disposed relative to the axis of said driving shaft and occupying substantially all of the casing, a numeral wheel set mounted on one of the bracing shafts and the other shaft constituting a secondary drive shaft operatively connected to the centrally positioned main drive shaft, a driving connection within the outlines of said frame between the secondary drive shaft and the numeral wheel set, said frame and associated parts including the driving shaft being balanced to bring the center of gyration in a circle with the axis of rotation as a center thereby to minimize any tendency of the centrifugal force developed during the revolving of the device from straining the frame.

Signed at New York city in the county of New York and State of New York, this 5th day of June A. D. 1920.

CLARENCE CARSON.